United States Patent [19]

Brault et al.

[11] Patent Number: 4,880,588

[45] Date of Patent: Nov. 14, 1989

[54] METHOD FOR PRODUCING A MOLDED ARTICLE HAVING COLORED FEATURES

[75] Inventors: Alfred F. Brault, South Berwick, Me.; John D. Gray, New Durham, N.H.

[73] Assignee: Davidson Textron Inc., Dover, N.H.

[21] Appl. No.: 232,624

[22] Filed: Aug. 15, 1988

Related U.S. Application Data

[63] Continuation-in-part of Ser. No. 74,354, Jul. 16, 1987, abandoned.

[51] Int. Cl.⁴ .................. B28B 7/14; B29C 39/12; B29C 41/08; B29C 41/18
[52] U.S. Cl. .................. 264/163; 264/245; 264/255; 264/302; 264/309
[58] Field of Search .............. 264/245–247, 264/255, 309, 302–304, 163, 308, 310, 254; 249/104, 103, 140; 425/112, 123, 435

[56] References Cited

U.S. PATENT DOCUMENTS

| | | | |
|---|---|---|---|
| 2,587,594 | 3/1952 | Chavannes et al. | 264/245 X |
| 3,300,557 | 1/1967 | Valentini | 264/245 X |
| 3,417,175 | 12/1968 | Brown et al. | 264/245 X |
| 3,439,083 | 4/1969 | Ugolin | 264/245 X |
| 3,504,063 | 3/1970 | Lemelson | 264/245 X |
| 3,651,191 | 3/1972 | Glatt et al. | 264/163 X |
| 3,943,212 | 3/1976 | Szatkowski | 264/309 X |
| 4,252,762 | 2/1981 | Stevenson | 264/245 X |
| 4,548,779 | 10/1985 | Steinberg et al. | 264/255 |
| 4,562,025 | 12/1985 | Gray | 264/245 X |
| 4,681,712 | 7/1987 | Sakakibara et al. | 264/255 X |
| 4,755,333 | 7/1988 | Gray | 264/302 X |
| 4,773,844 | 9/1988 | Baftels et al. | 264/302 X |
| 4,776,996 | 10/1988 | Ashton et al. | 264/309 X |
| 4,780,345 | 10/1988 | Gray | 264/245 X |
| 4,783,302 | 11/1988 | Kurimoto | 264/245 X |

FOREIGN PATENT DOCUMENTS

| | | | |
|---|---|---|---|
| 2038342 | 3/1972 | Fed. Rep. of Germany | 264/245 |
| 0142112 | 8/1984 | Japan | 264/245 |
| 0142113 | 8/1984 | Japan | 264/245 |
| 2174953 | 11/1986 | United Kingdom | 264/245 |

Primary Examiner—Jan H. Silbaugh
Assistant Examiner—Karen D. Kutach
Attorney, Agent, or Firm—John C. Evans

[57] ABSTRACT

A method for manufacturing decorative features in situ in a base layer cast plastic material includes the steps of providing a mold tool having a surface thereon which is recessed in the form of a desired decorative feature and includes a sharp break line between the recess and the surrounding mold surface; depositing a covering of thermoplastic material in the recess surface and heating the tool to melt the thermoplastic material on the recess surface to form segments of plastic corresponding to the desired decorative feature; thereafter cooling the covering and stripping it from the mold by separating it at the sharp break line interface between the deposited material on the recessed surface and a thin film membrane formed on the remainder of the mold surface so as to retain segments of material deposited in the recesses of the mold tool; reheating the mold tool recess to partially remelt the retained segments and thereafter depositing a base layer of thermoplastic material across the surface of the mold and reheating the mold to bond the retained segments to the base layer and cooling and stripping the mold to form a finished plastic shell having a decorative feature formed in situ therein.

9 Claims, 5 Drawing Sheets

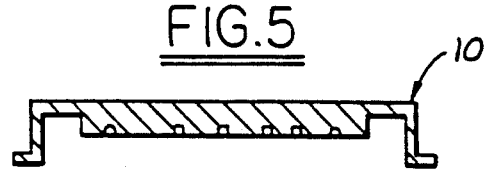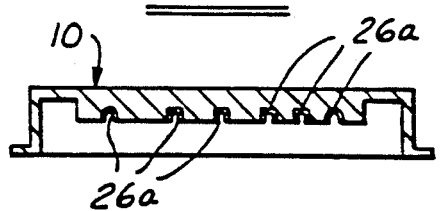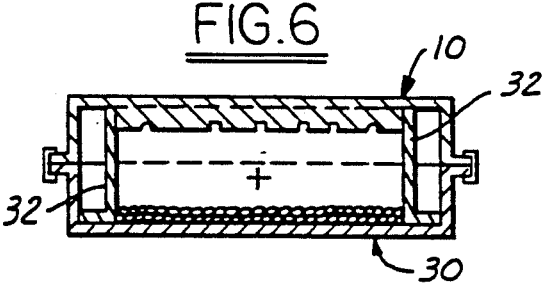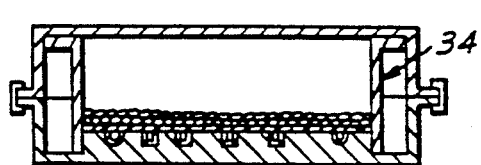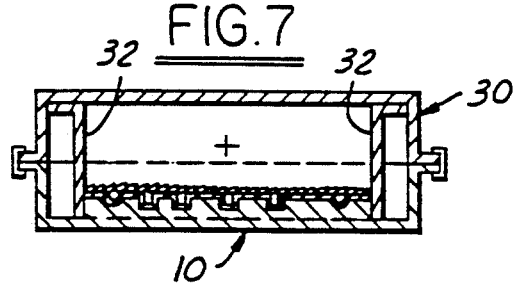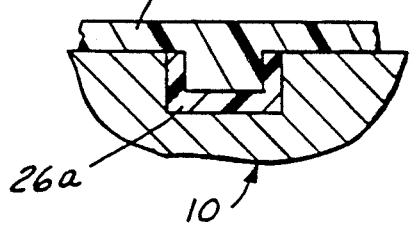

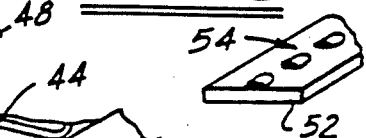
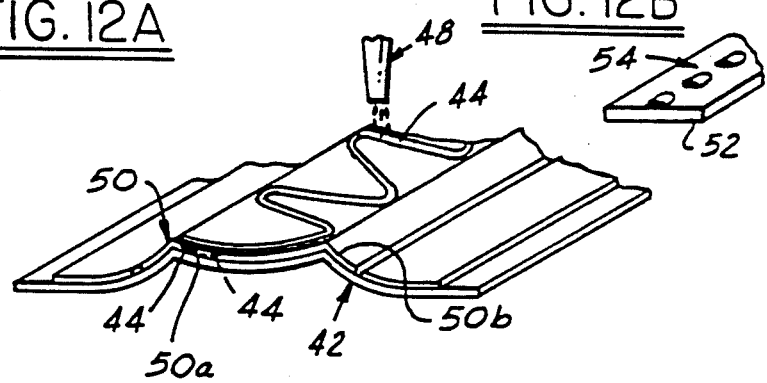
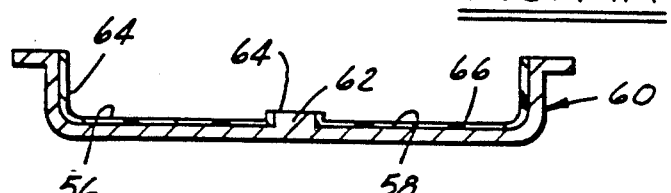
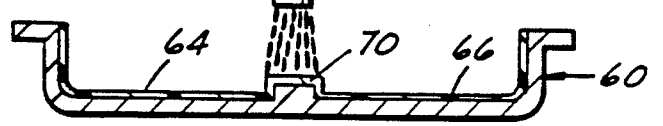
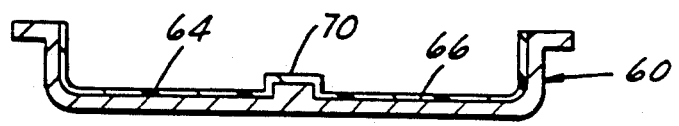

4,880,588

METHOD FOR PRODUCING A MOLDED ARTICLE HAVING COLORED FEATURES

This is a continuation-in-part application based on U.S. Ser. No. 074,354 filed July 16, 1988, now abandoned.

TECHNICAL FIELD

This invention relates to a method for forming thin walled hollow shells for products made from thermoplastic material, and more particularly, to a method for manufacturing such shells to have decorative features formed in situ.

BACKGROUND OF THE PRIOR ART

The use of thin walled plastic shells for products have included a cast shell of thermoplastic material with a decorative feature formed therein. One example is set forth in U.S. Pat. No. 4,610,620, which discloses apparatus for molding plural colored plastic hollow shells by a process in which a decorative pinstripe is formed as an integrally bonded joint between first and second segments of the shell. The joint between the shell components is used to replace a mechanical connection therebetween and to provide a pinstripe decorative feature in the shell component. However, the decorative pinstripe is formed only along the joint line of the joined parts and is not formed in situ in a base layer.

U.S. Pat. No. 4,562,025 discloses a mold method and apparatus for forming multicolored plastic shells which have first and second colored segments on the cast shell portions of the finished product. However, there are no decorative features formed in situ on the cast shell components of the trim part.

U.S. Pat. No. 4,562,032 discloses a method for forming grain coverings on reaction injection molded articles. Such grained shells are formed, in some cases, to have an integrally formed stitching feature around the perimeter thereof to provide an appearance of stitched materials.

While the above patents disclose shells cast from thermoplastic material which include decorative color and trim features, they do not disclose a method for providing decorative features such as colored lettering or colored stitching in situ on an eye discernible surface of a finished article formed by the method of depositing thermoplastic material on a heated mold surface.

Various other proposals have been suggested for providing decorative features on plastic products, however, the problem with prior approaches has been that they require separate connectors or adhesives to provide the decorative features on the outer surface of the product.

STATEMENT OF INVENTION AND ADVANTAGES

In the present invention, one feature is to provide a method for forming decorative features in situ of the eye discernible surface of shells cast from thermoplastic materials without requiring separate connectors or the use of adhesives or other bonding materials to secure the decorative features in place.

Another feature of the present invention is to provide in situ decorative features in the eye discernible surfaces of a shell formed from cast thermoplastic materials wherein the eye discernible features are formed of thermoplastic material which is formed in situ of a base layer by a same tooling as used to cast the base layer of material for the outer shell surface of the shell.

Yet another feature of the present invention is to provide an improved process for manufacturing plastic trim components for use in automobiles wherein a colored decorative feature is formed by the use of the same tooling used for producing a shell of thermoplastic material thereby eliminating the need for separate fasteners and adhesive connectors for securing decorative features on such components.

The invention, in one embodiment, forms stitch features in a thermoplastic shell by the process of depositing thermoplastic material against a heated mold surface having a stitch formation formed in the mold surface by further improvements comprising the steps of providing a stitch groove in the mold surface having a sharp break line between the groove and the surrounding portions of the mold surface; heating the mold surface and thereafter depositing a covering of thermoplastic material in the stitch groove and on adjacent portions of the mold as a thin membrane to complete a stitch pattern of one color which is separable from the thin membrane along a sharp break line when excessive material is removed from the stitch groove by pulling the thin membrane portion thereof from the mold; and thereafter reheating the heatable mold to partially remelt a retained stitch pattern and depositing a base layer of thermoplastic material on the heated mold so as to form the retained stitch pattern in situ in the base layer as an eye discernible color contrasting decorative feature therein.

Other advantages and a more complete understanding of the invention will be more apparent from the succeeding detailed description of the invention and the accompanying drawings thereof.

BRIEF DESCRIPTION OF THE DRAWINGS

FIG. 5 is a view of a separated mold and a powder box for casting a layer of thermoplastic material against the mold surface;

FIG. 6 is a view of a mold and a joined powder box for casting a thermoplastic layer;

FIG. 7 is a view of the joined mold and powder box following casting of the thermoplastic layer;

FIG. 8 is a view of a separate mold with retained decorative segments and a powder box having the material for forming a base layer;

FIG. 9 is a view of the base layer of material cast against the mold and the retained segments;

FIG. 10 is an enlarged, sectional view of the bonded interface between the base layer and a decorative segment;

FIG. 12A is a perspective view of a fragment of a mold having a decorative stitch feature recessed therein, and FIG. 12B shows a fragment of a product with the stitch feature thereon;

FIGS. 14A–14C are diagrammatic views of tooling used to form a pinstripe feature by use of a step including distributing liquid plastisol.

DETAILED DESCRIPTION OF THE INVENTION

The process of the present invention will be described with reference to production of a plastic shell for use as an automotive trim product with it being understood that other plastic products requiring an in situ decorative feature therein are equally suitable for manufacture by the process of the present invention.

Figure 2:
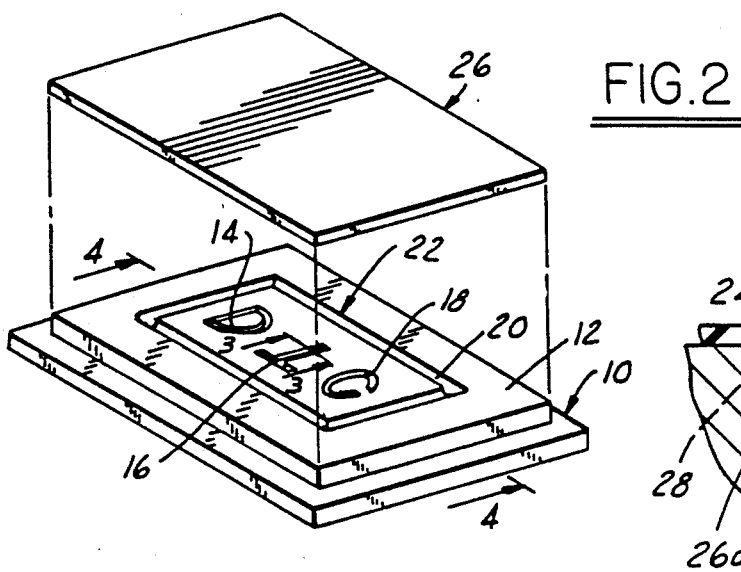
FIG. 2 is a perspective view of mold tooling with a covering of thermoplastic material being shown in exploded relationship with respect thereto.
Figure 3:
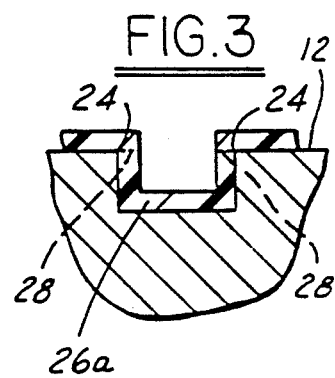
FIG. 3 is an enlarged sectional view taken along the line 3—3 of FIG. 2.

Referring to FIG. 2, a mold tool 10 is illustrated having a mold surface 12 thereon, a plurality of recesses 14, 16, 18 and 20 forming a logo 22 in the form of lettering with a boundary line. The recesses 14, 16, 18 and 20, as best shown in FIG. 3, each have a sharp break line 24 at the front interfacing edge to the mold surface 12. While the logo is shown as a part having a reduced planar extent, it should be understood that it can be formed on an extended surface mold of the type used to form larger plastic products such as luggage shells or instrument panel shells or other large area plastic products.

The improved process includes heating the mold tool 10. It is then covered with a covering 26 of thermoplastic material which includes segments 26a located in each of the recesses 14–20 and a thin membrane section 26b that covers the remainder of the logo on the mold surface 12.

Figure 4:
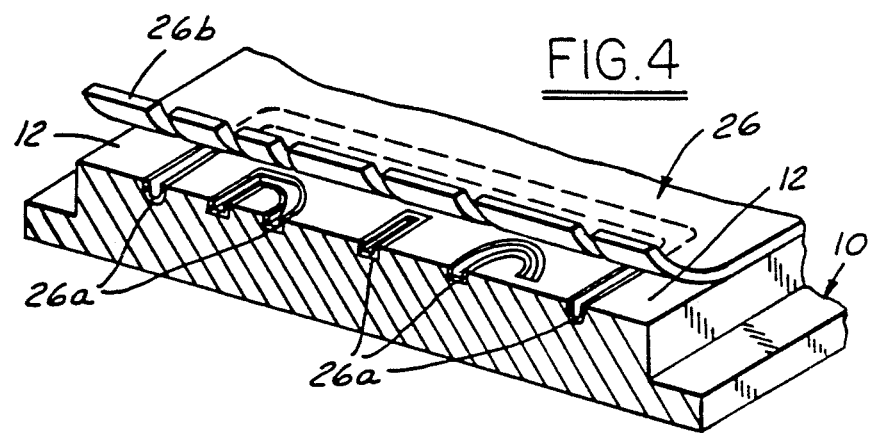
FIG. 4 is an enlarged perspective view sectioned on the line 4—4 of FIG. 2 looking in the direction of the arrows.

The segments 26a are trapped in the recesses 14–20 and are retained therein during a stripping step which is shown in FIG. 4. When the thin membrane 26b is stripped from the mold surface 12, by lifting as shown in FIG. 4. This causes the thin membrane 26b to tear along tear lines 28 at the break lines 24. Consequently, the covering 26 is removed from the tool to leave the trapped segments 26a in place therein.

In accordance with the present invention, the mold tool 10 is used in association with a powder casting box 30 which is joined to the mold tool 10 as shown in FIG. 6 and rotated in FIG. 7 to cause particles of thermoplastic material to be distributed so as to cover the full surface of the normal mold surface 12 which is sealed by a seal member 32 on the powder casting box 30.

The tool 10 is stripped by lifting to produce the retained segments 26a, as shown in FIG. 8. The tool 10 with the retained segments 26a is then associated with a second powder casting box 34 having a different color thermoplastic material therein which is distributed when the powder casting box 34 is inverted with respect to the mold tool 10 as shown in FIG. 10 to cover the remainder of the normal mold surface 12. This fills the trapped segments 26a so as to be bonded thereto.

Figure 11:
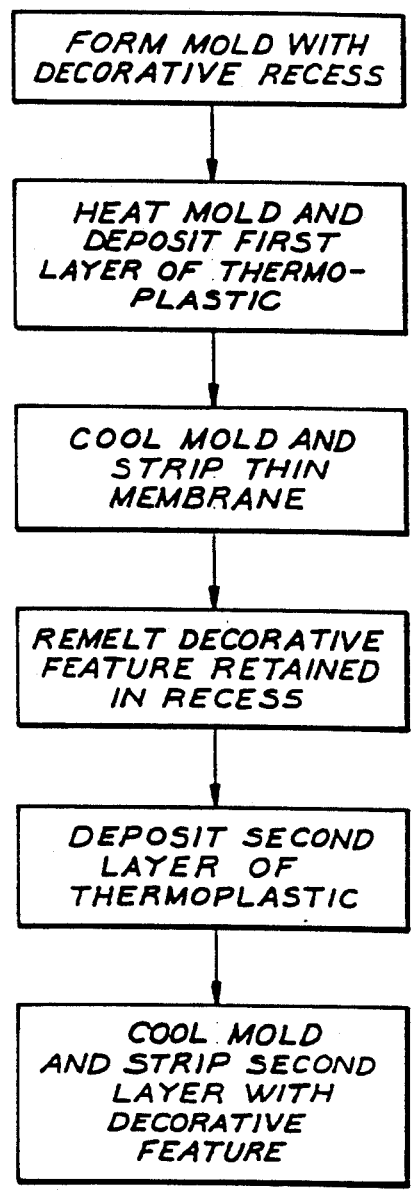
FIG. 11 is a flow chart of the process followed by use of the tooling shown in FIGS. 5 through 10.
Figure 13:
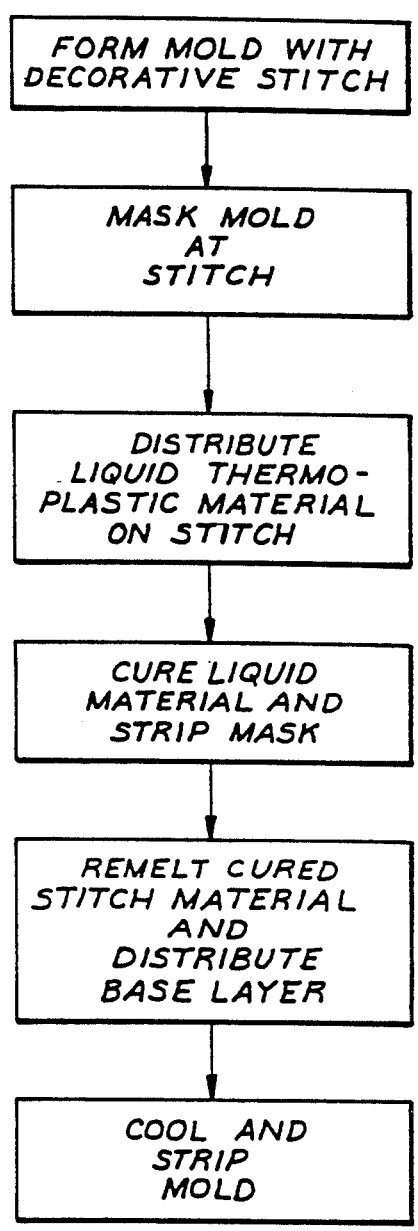
FIG. 13 is a flow chart of a process used in forming a decorative plastic part by use of the tooling in FIGS. 12A and 12B.

More particularly, as outlined in FIG. 11, in accordance with the present invention, the process includes the steps of forming a mold of the type shown in FIGS. 1 through 4 with decorative recesses therein. The mold is preheated to a temperature at which thermoplastic material will melt or cure thereon. The heated mold is connected to a powder box of the type shown in FIGS. 5–7 and distributed as a covering of material against the normal mold surface 12.

The mold tool 10 is then cooled and the covering 26 is stripped as shown in FIG. 4 to remove the thin membrane 26b at the sharp break lines 24 along the tear lines 28.

Figure 1:
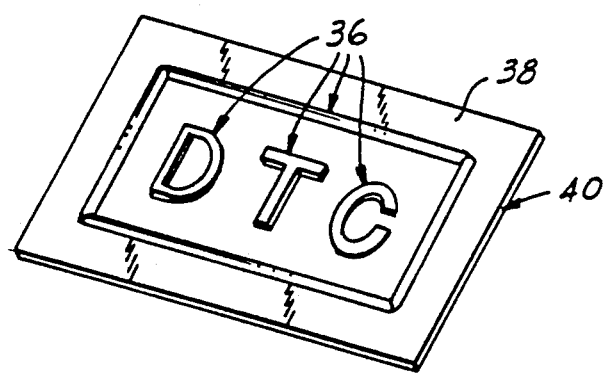
FIG. 1 is a diagrammatic view of product made by use of the present invention.

The next step of the process is to remelt the retained segments 26a and cast a base layer 38 of thermoplastic material against the mold surface 12. After the complete shell has been cast, the mold is cooled and the mold is stripped to form an in situ decorative feature 36 on a substrate (base layer) 38 of a part 40. The decorative feature 36 is raised from the substrate 38 as shown in FIG. 1. It has a contrasting color to that of the substrate 38.

The thin membrane 26b in one working embodiment is on the order of 0.008 inches thick. The stripping of covering 26 while retaining the thermoplastic segments 26a in the recesses is made possible because of the design of the reverse lettering which leaves the sharp break line 24 along the front interfacing edge of the recesses at the mold surface 12.

In another aspect of the present invention, the distribution of at least one of the layers of thermoplastic material can be accomplished by application of a liquid dispersion of a thermoplastic material against the heated mold surface. Thus as shown in FIG. 12A a mold tool 42 has a stitch recess 44. A first layer of sprayed plastisol is applied on the stitch recess 44. A suitable spray apparatus 48 is utilized to direct a liquid dispersion of thermoplastic material as a cover 50 over the stitch recess 44. The cover 50 fills the recess 44 with retained segments 50a and covers mold 42 with a membrane 50b. The mold tool 42 is heated to a desired cure temperature for a predetermined period of time and then cooled and excess material is removed from the mold by stripping the membrane 50b therefrom. The mold tool 42 is then reheated to remelt or partially remelt the segments 50a of cover 50 trapped in the stitch recess 44. Then the mold is connected to a suitable distribution system for casting dry powder thermoplastic material across the entire mold which has a color contrasting to the partially remelted segments 50a. The base layer of cast material melts on the mold and is bonded to segments 50a. The mold tool 42 is cooled and the base layer, along with the trapped stitch material in the recesses 42, is stripped from the mold. The result is a thermoplastic product having a base layer 52 of material of one color having an in situ integrally formed stitch pattern 54 formed on the surface thereof in color contrasting relationship thereto as shown in FIG. 12B.

The liquid dispersion method can also be used in conjunction with parts that provide a pinstripe of a type discussed in U.S. Pat. No. 4,610,620. In this process, a two compartment tool is connected to a powder distribution box that has a divider wall therein which separates first and second compartments. The compartments are provided to contain thermoplastic powder to be distributed against mold surfaces 56, 58 on a mold tool 60, which are separated by a divider 62. In this embodiment, the divider has a surface 64 thereon which will form a pinstripe in a finished article. When the mold tool and powder box are joined, a gasket covers the pin stripe surface and layers of material 64, 66 are on the mold surfaces 56, 58 as shown in FIGS. 14A, 14B, 14C. Thereafter, the tool is separated from the powder box and a liquid plastisol spray apparatus 68 is utilized to distribute a covering 70 of thermoplastic material against the mold surface 64. The covering 70 is cured to bond the cast layers 64, 66 to one another and to form a contrasting trim feature therebetween.

Referring now to the process embodiment of FIGS. 15 and 16A-16D, another process embodiment is disclosed for forming a two tone or two color shell for use in automobile trim components wherein thermoplastic material is selectively cast and sheared from a heated mold surface to form first and second panels of differing color.

Figure 15:
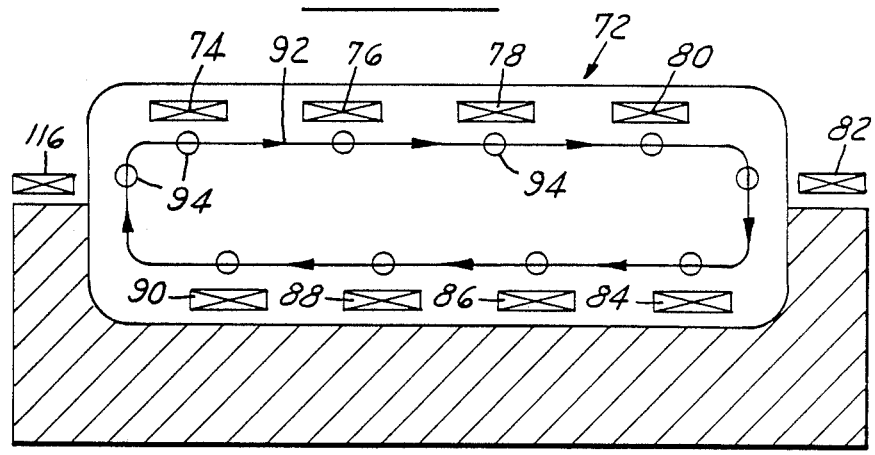
FIG. 15 is a diagrammatic view of an apparatus for practicing another process embodiment of the invention.

A schematic processing line 72 is shown in FIG. 15. It includes, in seriatim, a first preheat station 74, a first casting station 76, a first fusion station 78, a first cooling station 80, a strip or shear station 82; followed by a second preheat station 84, a second casting station 86, a second fusion station 88 and a second cooling station 90.

A conveyor 92 carries a plurality of mold tools 94 with respect to the aforesaid stations to produce selective deposits of different colored thermoplastic material of the type discussed above as schematically shown in FIGS. 16A-16D and with reference to the FIG. 11 process steps.

In this embodiment of the FIG. 11 process, the mold tools 94 have decorative features (FIG. 16A) in the form of a raised stepped casting surface 98 with breakline 96 between it and a two tone casting surface 100 to practice a one part tear, two tone process. The tools 94 are broken away in FIGS. 16A-16D with it being understood that a complete tool 94 encloses the surfaces 98, 100 on all sides while providing an opening 101 for casting thermoplastic material onto surfaces 98, 100.

Each mold tool 94 is carried by the conveyor 92 into alignment with the first preheat station 74 where it is heated to a temperature at which thermoplastic material will be melted thereon.

The heated mold tool 94 is then advanced to the first casting station 76 where a first layer 102 (FIG. 16B) of thermoplastic particles is cast in the form of either dry particles or a wet plastisol mixture of thermoplastic particles in a liquid carrier onto both surfaces 98, 100 and melted or cured thereon. The first layer 102 is in the form of a thin membrane having a thickness on the order of 0.010 inches. The tool 94 with the layer 102 thereon is advanced to the first fusion station where the layer 102 has its particles fused by holding the tool 94 at a desired cure temperature for a period of time to cure the thermoplastic material in layer 102. Thereafter, the tool 94 with the cured layer 102 thereon is advanced to the first cooling station 80 where it is cooled. The tool 94 with cooled and cured layer 102 is then advanced to station 82 where thin membrane segment 104 of layer 102 is stripped by shearing it with respect to a sharp edge 105 formed along the mold breakline 96.

Following separation of the thin membrane section 104, the conveyor 92 advances tool 94 and a retained thin membrane section 106 thereon to the second preheat station where the thin membrane section 106 is partially remelted and the tool 94 is reheated to a temperature at which thermoplastic material deposited thereon will melt and fuse.

Figure 16A:
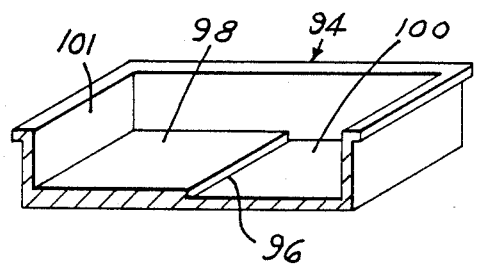
FIGS. 16A–D are fragmentary perspective views of a mold cavity part during different steps of the process embodiment of FIG. 15.
Figure 16C:
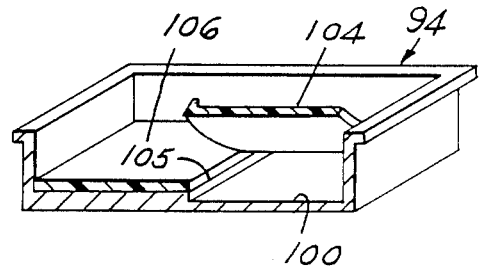
Figure 16B:
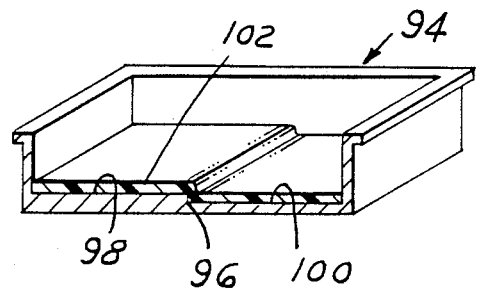
Figure 16D:
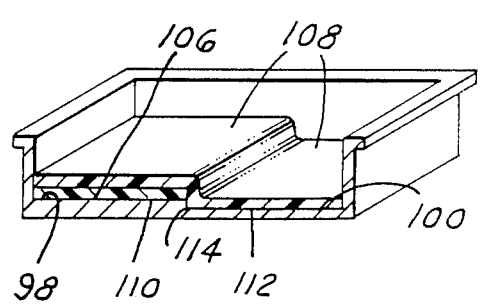

The reheated mold 94 (and the partially remelted thin membrane section 106 of a first color) are advanced to the second casting station 86 where a second layer 108 of thermoplastic material (either dry thermoplastic particles or a wet plastisol mixture) is deposited to cover the stripped casting surface 100 and the thin membrane section 106 on the decorative feature represented by the casting surface 98. The second layer 108 has a total thickness greater than the thickness of the thin membrane section 106 and as shown in FIG. 16D, the deposits have finish surface 110, 112 of two tone color with a sharp breakline 114 therebetween. The thickness of the cast layer 108 depends upon the physical requirements of the shell forming the wear surface of automotive trim parts such as armrests with thicknesses on the order of 0.040-0.090 inches being acceptable in proposed applications.

Following the second casting step, the mold tool 94 with the two tone part thereon is advanced to second fusion station 88 where the first cast thin membrane section 106 and the second cast 108 are cured. The part is then cooled at 90 and stripped at a final strip station 116.

While representative embodiments of apparatus and process of the present invention have been shown and discussed, those skilled in the art will recognize that various changes and modifications may be made within the scope and equivalency range of the present invention.

What is claimed is:

1. In a process for forming a decorative feature in situ in a base layer of a plastic shell made from thermoplastic material cast against a heated tool having a mold surface thereon the improvement comprising:
   forming a recessed surface on the mold surface corresponding to the desired decorative feature;
   providing a sharp breakline between the recessed surface and the mold surface;
   heating the mold surface;
   depositing a first layer of thermoplastic material on the mold surface and the recessed surface therein to provide a covering thereon and melting the covering into the recessed surface while simultaneously forming a thin membrane on the mold surface;
   cooling the covering including the thin membrane and lifting the thin membrane from the mold surface while separating the thin membrane from the material retained in the recessed surface which corresponds to the desired decorative feature, at the sharp breakline;
   reheating the tool to partially remelt the material retained in the recessed surface;
   depositing a base layer of thermoplastic material across the surface of the mold and bonding it to the partially remelted material retained in the recessed surface;
   cooling and stripping the bonded thermoplastic material from the mold surface so as to form the shell with the decorative feature defined by the material which was retained in the recessed surface and which was then formed in situ in the base layer of thermoplastic material.

2. In the process of claim 1, depositing the covering of thermoplastic material by spraying a liquid dispersion of the thermoplastic material into the recessed surface and across a limited contiguous surface of the mold surface;
   curing the liquid dispersion to form a layer of plastic in the recessed surface with a surrounding film which is lifted and stripped from the mold by breaking it from the deposited layer of plastic in the recessed surface at the sharp breakline formed between the recessed surface and the mold surface.

3. In the process of claim 1, forming the recessed surface as a raised stepped panel for defining two tone color panels;

providing a sharp edge on the stepped panel, shearing the thin membrane from the mold surface along the sharp edge as the thin membrane is lifted therefrom, and thereafter depositing the base layer of thermoplastic material.

4. In a process for forming a colored stitch feature in a thermoplastic shell which is formed by depositing thermoplastic material cast against a heated mold tool having a stitch formation formed in the mold surface the improvement comprising:

providing a stitch groove in the mold surface having a sharp breakline between the groove and the mold surface;

heating the mold surface;

depositing a first layer of thermoplastic material in the stitch groove and on the mold surface as a thin membrane which is separable from the stitch pattern along the sharp breakline while retaining the material in the stitch groove;

cooling the first layer of thermoplastic material including the thin membrane and lifting the thin membrane from the mold surface while separating the thin membrane and the material retained in the stitch groove at the sharp breakline;

reheating the tool to partially remelt the material retained in the stitch groove and depositing a base layer of thermoplastic material on the heated tool and the partially remelted material in the stitch groove for bonding the retained material to the base layer to form the colored stitch feature in situ of the base layer of thermoplastic material when it is cooled and stripped from the mold; and cooling and stripping the bonded thermoplastic material from the mold surface so as to form a shell with the thermoplastic material retained in the stitch groove being bonded in situ in the base layer of thermoplastic material.

5. In the process of claim 4, depositing the covering of thermoplastic material by spraying a liquid dispersion of the thermoplastic material into the stitch groove and across a limited contiguous surface of the mold surface;

curing the liquid dispersion to form a layer of plastic in the stitch groove with a surrounding film which is lifted and stripped from the mold by breaking it from the deposited layer of plastic in the recessed surface at the sharp breakline formed between the stitch groove and the mold surface.

6. In a process for forming a decorative feature in situ in a base layer of plastic material in a shell made from thermoplastic material cast against a heated tool having a mold surface thereon the improvement comprising;

forming a recessed surface on the mold surface corresponding to the desired decorative feature;

providing a sharp breakline between the recessed surface and the mold surface;

depositing a first layer of thermoplastic material on the mold surface and heating the tool having the hold surface to melt the thermoplastic material on the hold surface;

cooling and lifting the first layer of thermoplastic material from the hold surface at the breakline thereon while retaining thermoplastic material in the recessed surface corresponding to the desired decorative feature;

reheating the tool to partially remelt the first layer of material retained in the recessed surface;

depositing a second layer of thermoplastic material across the mold surface so as to cover the first layer of thermoplastic material and bond the partially remelted first layer of thermoplastic material to the second layer of thermoplastic material; and cooling and stripping the first and second layers of thermoplastic material from the mold surface so as to form the shell with the decorative feature defined by the first layer of thermoplastic material formed in situ in the second layer of thermoplastic material.

7. In the process of claim 6, the first layer of thermoplastic material being deposited as a dry powder on the heated tool.

8. In the process of claim 6, the tool being formed to have the decorative surface on a divider between first and second portions of the mold surface; the first layer of thermoplastic material being deposited on the divider as a liquid dispersion which is cured to form a decorative feature formed integrally with a second layer of thermoplastic material deposited on the first and second portions of the mold surface.

9. In the process of claim 6, forming the surface as a raised stepped panel for defining two tone color panels;

providing a sharp edge on the stepped panel, shearing the thin membrane from the mold surface along the sharp edge as the thin membrane is lifted therefrom, and thereafter depositing the base layer of thermoplastic material.

* * * * *